Patented Dec. 15, 1936

2,064,331

UNITED STATES PATENT OFFICE 2,064,331

ARYLAMIDES OF FUROYL-ACETIC ACID

Frithjof Zwilgmeyer, Wilmington, Del., assignor to E. I. du Pont de Nemours & Company, Wilmington, Del., a corporation of Delaware No Drawing. Application July 18, 1935, Serial No. 31,998

14 Claims. (Cl. 260—54)

This invention relates to new compounds and to means of making them. More specifically the invention relates to new compounds being furoyl-acetic arylamides and means of making them.

In the prior art there are described acyl-acetyl derivatives of arylamines. Those compounds find use in various phases of industry and it is desirable that improvements in and substitutes for them be prepared.

It is an object of this invention to prepare new compositions of matter. Another object of the invention is to prepare new intermediates for azo dyestuffs. Another object of the invention is to prepare these new compositions and intermediates by processes which are technically and economically satisfactory.

The objects of the invention are accomplished, generally speaking, by making and using new compounds being furoyl-acetyl derivatives of primary arylamines, preferably of the mono amine or arylene-diamine series.

In a preferred method of carrying out my invention the new products are made by diluting an ester of furoyl-acetic acid, for instance the ethyl ester, with an inert solvent, heating the solution in a vessel, preferably fitted with a reflux condenser, to a temperature of about 150° C., and gradually adding to the solution slightly less than the equivalent quantity of an arylamine. As the reaction proceeds an alcohol and a furoyl-acetyl-arylamide are formed. The efficiency of the reaction may be increased by the presence of a catalyst, and by so arranging the reflux condenser that the alcohol will be distilled off as rapidly as it is formed. After the condensation is completed, the reaction mass may be cooled and the products isolated and purified.

The ethyl ester of furoyl-acetic acid is used in the preferred embodiment of the invention because of its satisfactory nature, but the other esters of furoyl-acetic acid, for example, the methyl, propyl, butyl and higher esters also give satisfactory results. The alcohol obtained as one of the reaction products will differ in nature, of course, according to the ester which is employed. Thus, if the butyl ester of furoyl-acetic acid is used, butyl alcohol will be produced.

The primary arylamines are generally useful in the reaction. Within the term arylamines is included not only the aryl-monoamines and aryl-diamines but the arylamines of the benzene or naphthalene series. The aryl nuclei of these amines may contain substituents such as alkyl, alkoxy, halogen, aryloxy, aralkyl, aralkoxy, aryl, hydroaryloxy, and trifluoro-alkyl. If increased water-solubility of the final product is desired, the aryl nuclei may also contain either of the substituents COOH or SO$_3$H. Exemplary of the arylamines whose use in the processes of the invention is satisfactory are the following: meta-phenylene-diamine, 1,5-diamino-naphthalene, beta-amino-anthraquinone, 3-amino-carbazole, 2,7-diamino-fluorene, meta-amino-benzo-trifluoride, para-nitro-aniline, 4,4'-diamino-diphenyl-ether, tolidine, 4,4'-diamino-stilbene, 4,4'-diamino-azo-benzene, 4,4'-diamino-azoxy-benzene, 4,4'diamino-diphenylamine, 4,4'-diamino-diphenyl-methane, 4,4'-diamino-diphenyl-sulfide.

There will be found useful in the propagation of this reaction those catalysts which have heretofore been found useful for the preparation of aceto-acetyl-arylamides.

The following examples, in which all quantities are stated in parts by weight, illustrate but do not limit the invention.

Example I

*Furoyl-acetyl-4-chloro-aniline*

20 parts of ethyl-furoyl-acetate and 20 parts of xylene were mingled in a vessel equipped with a column capable of refluxing the xylene and permitting the removal of the alcohol as quickly as formed. The mixture was heated to refluxing temperature, a solution containing 11.5 parts of 4-chloro-aniline, 2 parts of pyridine, and 25 parts of xylene was slowly added to the solution, the addition requiring about a half hour, and the reaction mass was boiled for an additional ten minutes and cooled. A crystalline product formed, was filtered off, and was purified by dissolving in a solution containing 2.5 parts of sodium hydroxide and 200 parts of water. The solution was filtered and the filtrate was acidified, reprecipitating the product in a purified form. The purified material was filtered off, dissolved in and recrystallized from alcohol, and was dried. It melted at 131–133° C. The yield was 59% of the theoretical. The product is represented by the formula:

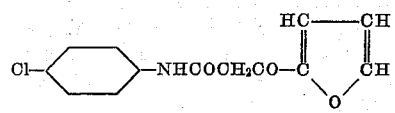

Example II

*Furoyl-acetyl-4-methyl-aniline*

20 parts of furoyl-acetic ester and 20 parts of xylene were mingled in a vessel beneath a reflux condenser and heated to refluxing temperature. A solution of 9.5 parts of para-toluidine, 2 parts of pyridine, and 35 parts of xylene was slowly added, addition requiring about one half hour. The procedure thereafter followed that of Example I, and upon completion of the reaction the charge was cooled, the crude product was filtered off and was purified by recrystallization from ethyl alcohol solution. A 66% yield of a product melting at 142–144° C. was obtained. The product is represented by the formula:

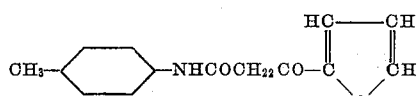

Example III

Furoyl-acetyl-4-phenetidine

The process of Example II was repeated, substituting 11.5 parts of para-phenetidine for the para-toluidine. A 65% yield of purified product, melting at 126–125° C., was obtained. The material is represented by the formula:

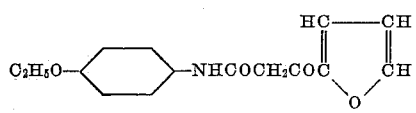

Example IV

Furoyl-acetyl-2,5-diethoxy-aniline

A solution of 17 parts of 2,5-diethoxy-aniline in 40 parts of xylene was added during one-half hour to a refluxing mixture of 20 parts of furoyl-acetic ester and 25 parts of xylene. After reaction was complete, the mass was cooled, the crude product filtered off and recrystallized from alcohol. An 81% yield of material, melting at 118–120° C., was obtained. It is represented by the formula:

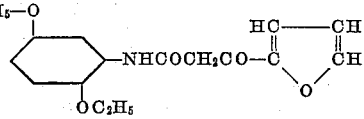

Example V

Furoyl-acetyl-2-methyl-5-chloro-aniline

A mixture of 12.5 parts of 4-chloro-2-amino-toluene and 1 part of pyridine was added during one-half hour to a refluxing mixture of 20 parts of furoyl-acetic ester and 40 parts of xylene. When the reaction was complete, the product was isolated and purified as in the preceding examples. The purified material was obtained in a 73% yield and melted at 131–133° C. It is represented by the formula:

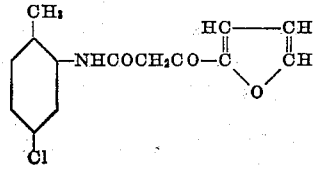

Example VI

Furoyl-acetyl-2-methoxy-1-naphthylamine 20 parts of furoyl-acetic ester were added all at once to a boiling solution of 16 parts of 2-methoxy-1-naphthylamine in 40 parts of xylene, the reaction mass was refluxed for three-quarters of an hour, the ethyl alcohol passing off. The mass was cooled, the crude product was separated by filtration, was stirred with an excess of 5% sodium-hydroxide solution, the solution was filtered, and the product precipitated by acidification. It was filtered off, and recrystallized from ethyl alcohol. The pure material, represented by the formula given below, melted at 173–175° C.

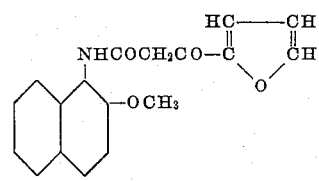

Example VII

Di-furoyl-acetyl-tolidine-sulfone

A mixture of 20 parts of furoyl-acetic-ester, 40 parts of xylene, and 5 parts of pyridine was heated to boiling and 19 parts of 4,4'-diamino-tolidine-sulfone added. The mixture was boiled for ten minutes, cooled, the crude product was filtered off, slurried with boiling ethyl alcohol, and filtered. A 59% yield of material melting at 275–280° C. was obtained. It is represented by the formula:

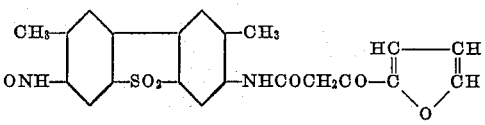

By processes similar to those above detailed, the following additional compounds were prepared:

| Example No. | Compound | Melting point |
|---|---|---|
| VIII | Furoyl-acetyl-2,5-dimethyl-4-chloro-aniline. | 147–149° C. |
| IX | Furoyl-acetyl-2,5-diethoxy-4-chloro-aniline. | 154–156° C. |
| X | Furoyl-acetyl-2-methoxy-aniline | 108–109° C. |
| XI | Furoyl-acetyl-2,5-dimethoxy-aniline | 121–123° C. |
| XII | Furoyl-acetyl-2-methoxy-5-chloro-aniline. | 116–117° C. |
| XIII | Furoyl-acetyl-para-anisidine | |
| XIV | Furoyl-acetyl-tolidine-azone, represented by the formula: | |

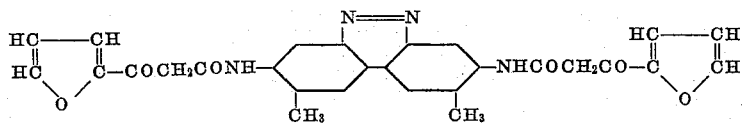

The products of this invention are particularly useful as intermediates for azo dyestuffs. An advantage of the process features of the invention resides in that they are technically and economically satisfactory.

As many apparently widely different embodiments of this invention may be made without departing from the spirit and scope thereof, it is to be understood that I do not limit myself to the specific embodiments thereof except as defined in the appended claims.

I claim:
1. A process which comprises mixing and heating under reflux 20 parts of a saturated lower alkyl ester of furoyl-acetic acid and 20 parts of xylene, admixing during a half hour a solution containing 11.5 parts of para-phenetidine, 2 parts of pyridine, and 35 parts of xylene, boiling for about ten minutes, cooling, filtering, dissolving the precipitate in sodium hydroxide solution, acidifying, filtering, dissolving the filtrate in alcohol, recrystallizing, and drying.

2. The method which comprises mixing and heating under reflux 20 parts of a saturated lower alkyl ester of furoyl-acetic acid and 20 parts of xylene, admixing a solution containing 11.5 parts of para-phenetidine, 2 parts of pyridine, and 35 parts of xylene, boiling, cooling, filtering, and purifying.

3. The method which comprises reacting 20 parts of a saturated lower alkyl ester of furoyl-acetic acid with 11.5 parts of para-phenetidine in the presence of pyridine and an inert solvent, precipitating the product and purifying it.

4. The method of making an alcohol and foroyl-acetyl-amide which comprises reacting a saturated lower alkyl ester of furoyl-acetic acid with one of a group consisting of an aryl-monoamine and an arylene diamine.

5. The method of making an alcohol and a furoyl-acetyl-amide which comprises reacting a saturated lower alkyl ester of furoyl-acetic acid with an arylamine.

6. The method of making an alcohol and a furoyl-acetyl-amide which comprises reacting a saturated lower alkyl ester of furoyl-acetic acid with para-phenetidine.

7. The method of making an alcohol and a furoyl-acetyl-amide which comprises reacting a saturated lower alkyl ester of furoyl-acetic acid with an aryl-monoamine.

8. The method of making an alcohol and a furoyl-acetyl-amide which comprises reacting a saturated lower alkyl ester of furoyl-acetic acid with an arylene diamine.

9. Furoyl-acetyl-4-phenetidine.

10. A compound being a furoyl-acetyl derivative of an arylamine.

11. A compound being a furoyl-acetyl derivative of an arylamine of the benzene or naphthalene series.

12. A compound being a furoyl-acetyl derivative of an aryl-monoamine.

13. A compound being a furoyl-acetyl derivative of an aryl-diamine.

14. A compound being a furoyl-acetyl derivative of one of a group consisting of an aryl-monoamine and an arylene diamine.

FRITHJOF ZWILGMEYER.